United States Patent
Sumida et al.

(10) Patent No.: US 6,821,678 B2
(45) Date of Patent: Nov. 23, 2004

(54) PROCESS OF PRODUCING MANGANESE DIOXIDE FOR A LITHIUM PRIMARY BATTERY

(75) Inventors: Hiroshi Sumida, Saitama (JP); Kiyoteru Enomoto, Hiroshima (JP); Masaki Sato, Hiroshima (JP)

(73) Assignee: Mitsui Mining & Smelting Company, Ltd., Tokyo (JP)

( * ) Notice: Subject to any disclaimer, the term of this patent is extended or adjusted under 35 U.S.C. 154(b) by 363 days.

(21) Appl. No.: 09/752,781

(22) Filed: Jan. 3, 2001

(65) Prior Publication Data

US 2001/0024752 A1 Sep. 27, 2001

(30) Foreign Application Priority Data

Feb. 25, 2000 (JP) .......................................... 2000-48802

(51) Int. Cl.⁷ .......................... H01M 4/50; H01M 4/04; C01G 45/02
(52) U.S. Cl. ....................... 429/224; 423/605; 423/599; 252/182.1
(58) Field of Search .......................... 429/224; 423/599, 423/605

(56) References Cited

U.S. PATENT DOCUMENTS

| 5,698,176 A | 12/1997 | Capparella et al. |
| 6,383,683 B1 * | 5/2002 | Nagayama et al. ......... 429/224 |

FOREIGN PATENT DOCUMENTS

| EP | 0 373 791 A1 | 6/1990 |
| EP | 1 043 275 A1 | 10/2000 |
| JP | 57-4064 | 1/1982 |
| JP | A 3-84858 | 4/1991 |
| JP | A 3-93163 | 4/1991 |
| JP | A 2000-48817 | 2/2000 |
| WO | WO00/06496 * | 2/2000 ........... C01G/45/00 |

* cited by examiner

*Primary Examiner*—Mark Ruthkosky
(74) *Attorney, Agent, or Firm*—Young & Thompson

(57) ABSTRACT

Manganese dioxide for lithium primary batteries which is obtained by soda neutralization and heat treatment of electrolytic manganese dioxide and has a sodium content of 0.05 to 0.2% by weight and a process for producing the same.

2 Claims, 4 Drawing Sheets

PROCESS OF PRODUCING MANGANESE DIOXIDE FOR A LITHIUM PRIMARY BATTERY

BACKGROUND OF THE INVENTION

1. Field of the Invention

The present invention relates to manganese dioxide for lithium primary batteries and a process for producing the same. More particularly, it relates to an improvement of a cathode active material of a lithium primary battery comprising lithium or a lithium alloy as an anode active material.

2. Description of the Related Art

Typical cathode active materials known for lithium primary batteries comprising lithium or a lithium alloy as an anode active material include manganese dioxide, carbon fluorid, etc., which have been put to practical use.

Manganese dioxide out of these cathode active materials has been used for preference for its inexpensiveness and abundance.

Where manganese dioxide is used as a cathode active material, it is a generally followed practice that electrolytic manganese dioxide is heat treated at 350 to 430° C. as disclosed, e.g., in Japanese Patent Publication No. 4064/82.

Electrolytic manganese dioxide to be heat treated is one having been neutralized with ammonia. Electrolytic manganese dioxide itself is useful as a cathode material in manganese dry batteries and alkaline manganese dry batteries. Ammonia-neutralized one is for manganese dry batteries, and soda-neutralized one is for alkaline manganese dry batteries. Electrolytic manganese dioxide having been neutralized with soda and heat treated contains 0.3 to 0.5% by weight of sodium. If the sodium-containing manganese dioxide is applied to a lithium primary battery, the lithium primary battery has significantly reduced discharge performance because the residual sodium in manganese dioxide contaminates the anode lithium to interfere with the electrode reaction.

For the above reason, ammonia neutralization has been adopted because ammonia evaporates together with the water content during heat treatment. It has been pointed out, however, that ammonia neutralization is accompanied by the problem of irritating smell given off on ammonia evaporation which deteriorates the working environment. In addition, an existing plant having no step of ammonia neutralization could not be applied as such to preparation of manganese dioxide for lithium primary batteries.

Ammonia-neutralized manganese dioxide has another disadvantage that it undergoes marked reduction in BET specific surface area, which leads to deterioration of low-temperature characteristics or storage characteristics when applied to lithium primary batteries.

SUMMARY OF THE INVENTION

The present invention has been made in the light of the above-described circumstances. An object of the invention is to provide manganese dioxide for lithium primary batteries and a process for producing the same which achieve improvement on working environment, reduction of sodium dissolution, and improvement on low-temperature characteristics and storage characteristics of batteries.

As a result of extensive investigation, the present inventors have found that the above object is accomplished by carrying out soda neutralization of electrolytic manganese dioxide while controlling the sodium content within a given range.

The present invention has been completed based on this finding. The present invention provides manganese dioxide with a sodium content of 0.05 to 0.2% by weight for lithium primary batteries which is obtained by soda neutralization and heat treatment of electrolytic manganese dioxide.

The present invention also provides a process for producing manganese dioxide with a sodium content of 0.05 to 0.2% by weight for lithium primary batteries comprising the steps of neutralizing electrolytic manganese dioxide with an aqueous solution containing 2.0 to 5.0 g of sodium hydroxide per kg of manganese dioxide and then heating the neutralized manganese dioxide.

The manganese dioxide for lithium primary batteries according to the present invention brings about improved on the working environment, has reduced sodium dissolution, and improves low-temperature characteristics and storage characteristics of batteries. The process according to the present invention provides such manganese dioxide on an industrial scale with satisfactory workability and ease.

BRIEF DESCRIPTION OF THE DRAWINGS

The present invention will be more particularly described with reference to the accompanying drawings, in which.

DETAILED DESCRIPTION OF THE INVENTION

Figure 1:
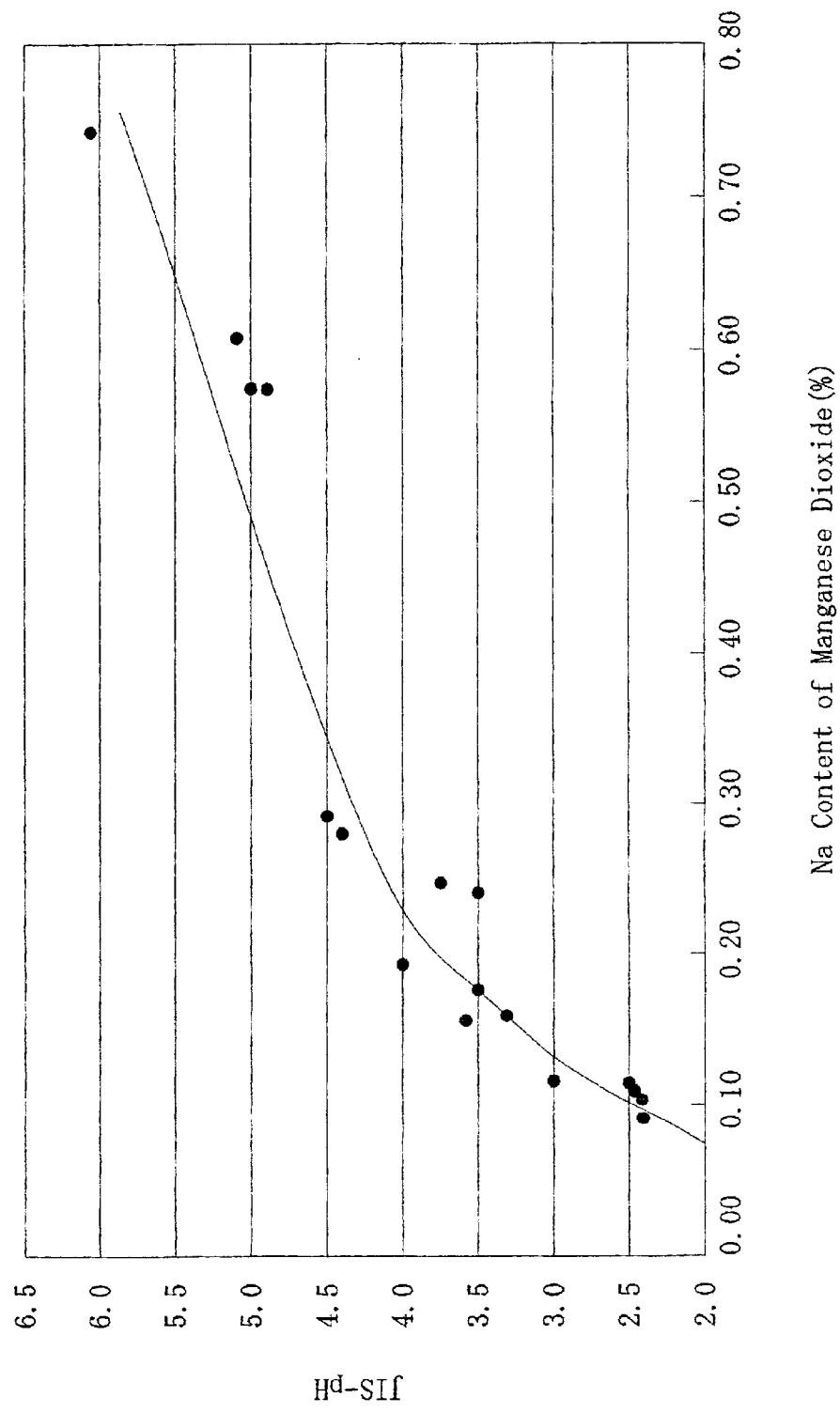
FIG. 1 is a graph of JIS-pH vs. Na content of manganese dioxide.

The manganese dioxide for lithium primary batteries according to the present invention is electrolytic manganese dioxide obtained by an electrolysis process. As stated above, electrolytic manganese dioxide has advantages of inexpensiveness and abundance.

The electrolytic manganese dioxide of the present invention has a sodium content of 0.05 to 0.2% by weight. When used as a cathode active material of a lithium primary battery, electrolytic manganese dioxide having a sodium content exceeding 0.2% by weight has its sodium content displaced with lithium and precipitated to reduce the storage characteristics of the battery. Electrolytic manganese dioxide with a sodium content smaller than 0.05% by weight has residual acidity due to insufficient neutralization, causing reduction in storage characteristics of the battery.

The manganese dioxide of the invention preferably has an amount of sodium dissolution of 20 g/l or less. If the amount of sodium dissolution exceeds 20 g/l, sodium will be displaced with lithium to reduce the storage characteristics of the battery as mentioned above.

As compared with ammonia-neutralized manganese dioxide, the soda-neutralized manganese dioxide of the present invention is advantageous in that the reduction in BET specific surface area is small when heat treated. That is, when treated at 430° C. for 4 hours, ammonia-neutralized manganese dioxide reduces its BET specific surface area from 50 $m^2$/g to 20 $m^2$/g, while the BET specific surface area of the soda-neutralized manganese dioxide (50 $m^2$/g) is not reduced to less than 30 $m^2$/g. This means that soda-neutralized manganese dioxide could be heat treated at higher temperatures than ammonia-neutralized manganese dioxide, with the resultant reduction in BET specific surface area being the same, to bring about improvements on low-temperature characteristics and storage characteristics of batteries.

The manganese dioxide according to the present invention can preferably be produced as follows. The starting manganese dioxide is obtained by electrolysis. For example, a manganese sulfate aqueous solution having a prescribed concentration is electrolyzed at a constant current density while warming by using a carbon plate as a cathode and a titanium plate as an anode to deposit electrolytic manganese dioxide on the anode. The deposited electrolytic manganese dioxide is peeled from the anode, ground, and neutralized. It is particularly preferred to use manganese dioxide having a phosphorus content of 0.05 to 2.0% by weight disclosed in Japanese Patent Publication No. 1698/94.

Neutralization is carried out with a sodium hydroxide aqueous solution. The sodium content in the manganese dioxide is controlled by using an aqueous solution containing 2.0 to 5.0 g of sodium hydroxide per kg of the manganese dioxide. The sodium hydroxide aqueous solution usually has a concentration of 100 to 150 g/l. The neutralizing agent which can be used is not limited to sodium hydroxide and includes sodium carbonate and sodium hydrogencarbonate having an equivalent sodium content.

The soda-neutralized electrolytic manganese dioxide is washed with water, dried, and then heat treated to obtain manganese dioxide for lithium primary batteries which contains 0.05 to 0.2% by weight of sodium.

The batteries were subjected to a discharge cycle test in which a 3-second discharge at 900 mA followed by a 27-second rest made one cycle, and the discharge characteristics of the batteries and the color change of the lithium anode are shown in Table 1.

The soda-neutralized manganese dioxide species of Examples 1 and 2 and Comparative Example 1 were further evaluated in terms of JIS-pH, electrical conductivity, Na dissolution, and $SO_4$ dissolution in accordance with the following method. The results obtained are shown in Table 1.

(1) JIS-pH

Measured in accordance with JIS K1467.

(2) Electrical Conductivity

With the use of a supernatant liquid obtained from the mixture of 10 g of manganese dioxide and 200 mL of deionized water after stirring the mixture for 20 minutes, measurement was carried out with a commercially available portable conductivity meter, (3) Na Dissolution Measured by ICP analysis.

(4) $SO_4$ Dissolution

Measured by ICP analysis.

TABLE I

| | NaOH (g/kg-$MnO_2$) | Na Content (%) | Discharge Cycle* | Color Change of Li | Smell on Heat Treatment | Product Na Content (%) | JIS-pH | Conductivity ($\mu$S/cm) | Na Dissolution (mg/l) | $SO_4$ Dissolution (mg/l) |
|---|---|---|---|---|---|---|---|---|---|---|
| Example 1 | 3.0 | 0.1 | 101 | no change | no smell | 0.1 | 2.4 | 100 | 10 | 35 |
| Example 2 | 5.0 | 0.2 | 100 | no change | no smell | 0.2 | 3.4 | 50 | 12 | 12 |
| Comparative Example 1 | 10.0 | 0.5 | 54 | observed | no smell | 0.5 | 4.8 | 150 | 25 | 8 |
| Comparative Example 2 | — | 0.01 | 46 | no change | no smell | — | — | — | — | — |
| Comparative Example 3 | $NH_3$-neutralized product | <0.01 | 100 | no change | emitted | — | — | — | — | — |

*The number of cycles of the $NH_3$-neutralized product was taken as a standard (100).

The present invention will now be illustrated in greater detail with reference to Examples. The following Examples are presented as being exemplary of the present invention and should not be considered as limiting. Unless otherwise noted, all the percents are by weight.

EXAMPLES 1 AND 2 AND COMPARATIVE EXAMPLES 1 TO 3

Electrolytic manganese dioxide having a phosphorus content of 0.25% was neutralized by addition of a sodium hydroxide aqueous solution having the concentration shown in Table below. The neutralized manganese dioxide was collected by filtration, washed with water, and dried. The manganese dioxide was then heated at 430° C. for 4 hours. The sodium content of the resulting manganese dioxide is shown in Table 1.

For comparison, ammonia-neutralized manganese dioxide was prepared in a conventional manner.

A CR123A type battery was assembled with each of the resulting manganese dioxide species as a cathode active material, a solution of $LiCF_3SO_3$ in a 1:1 mixed solvent of propylene carbonate and 1,2-dimethoxyethane as an electrolytic solution, and a lithium electrode as an anode material.

It can be seen from Table 1 that the products of Examples 1 and 2 are equal in performance to the conventional product of Comparative Example 3. The conventional soda-neutralized product of Comparative Example 1 and the non-neutralized product of Comparative Example 2 are inferior in cycle characteristics. The conventional ammonia-neutralized product of Comparative Example 3 emitted the smell of ammonia while heat treated. The soda-neutralized products of Examples 1 and 2 have a smaller amount of Na dissolution than the product of Comparative Example 1.

TEST EXAMPLE

Figure 2:
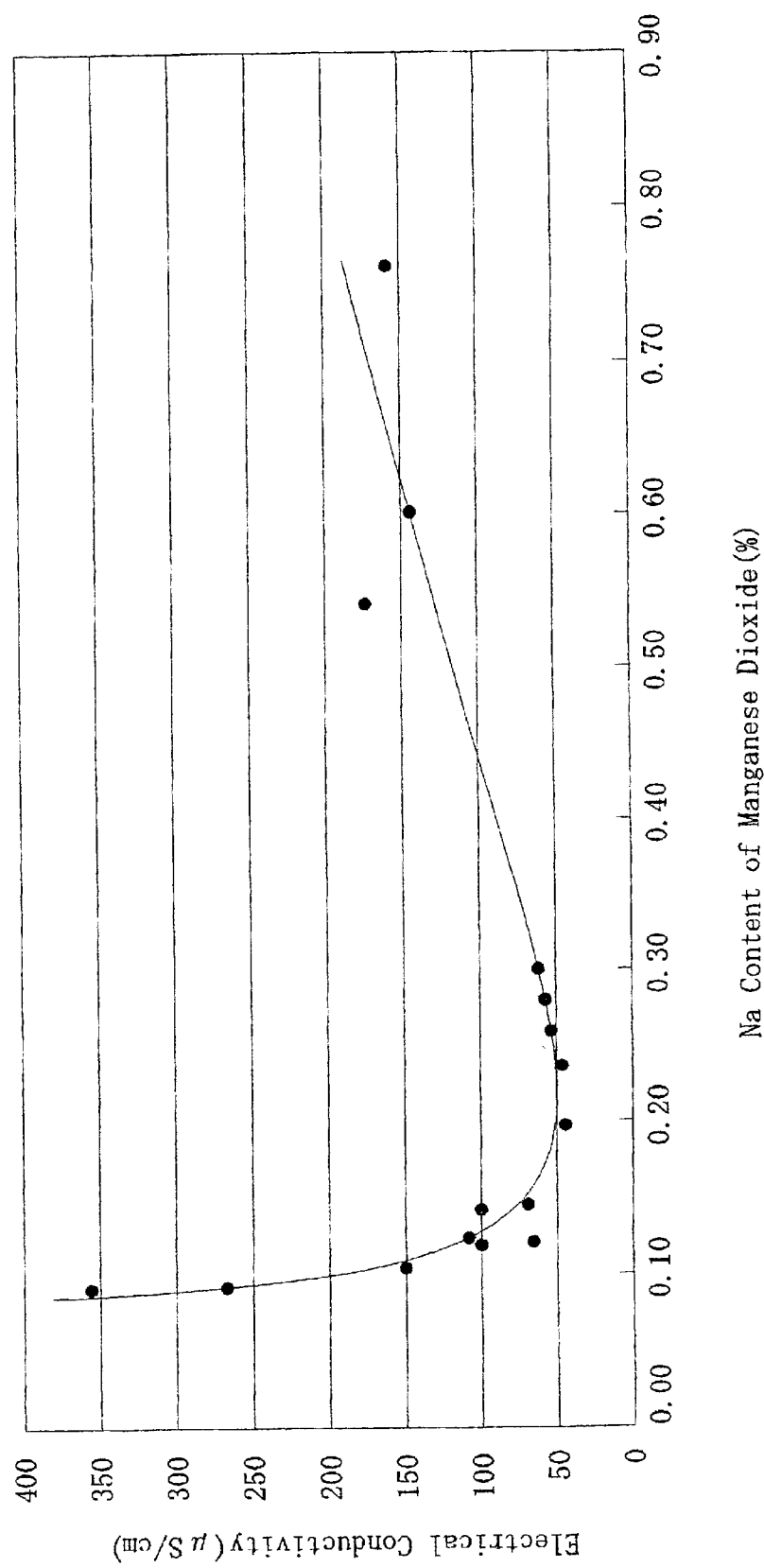
FIG. 2 is a graph of electrical conductivity vs. Na content of manganese dioxide.
Figure 3:
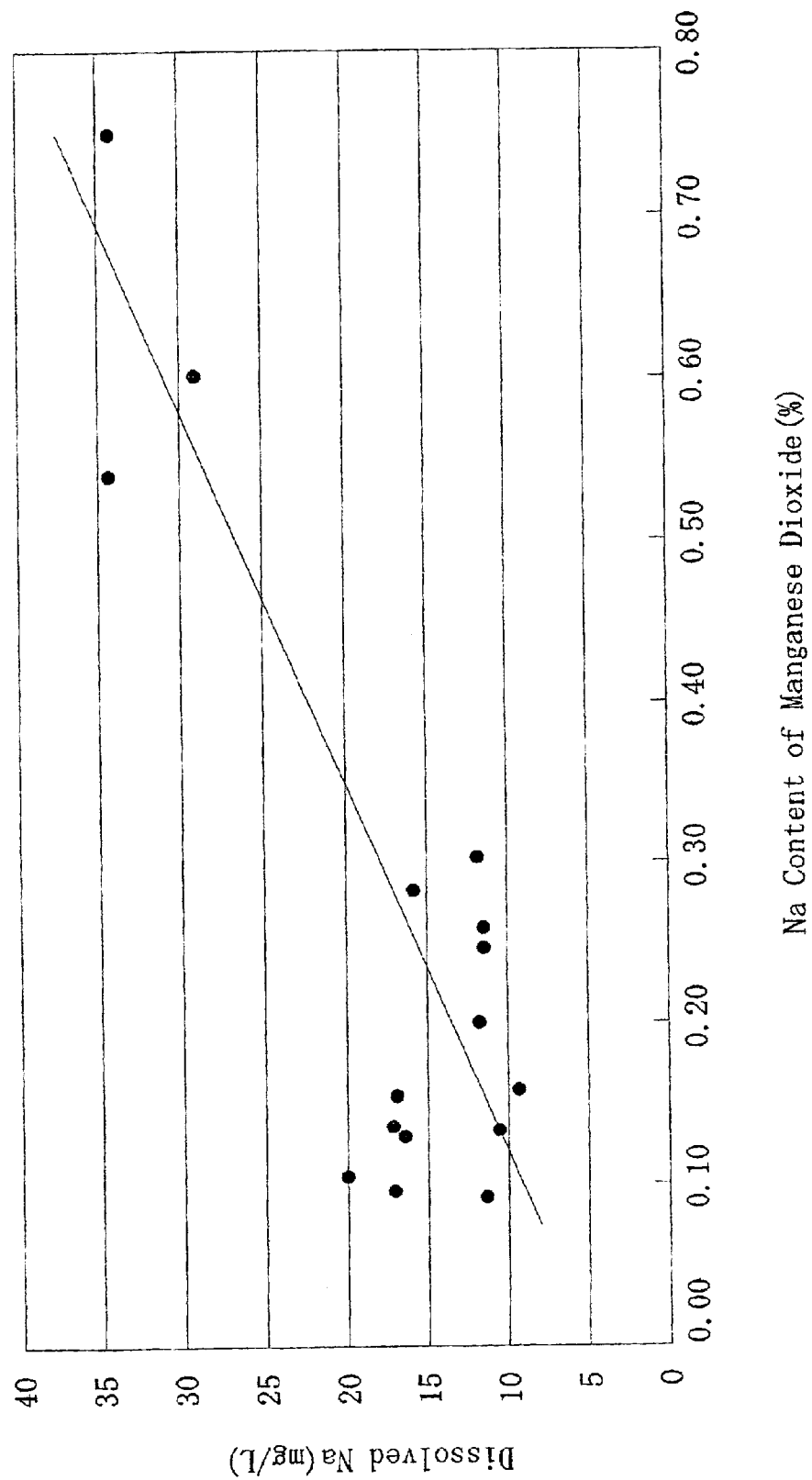
FIG. 3 is a graph of dissolved Na vs. Na content of manganese dioxide.
Figure 4:
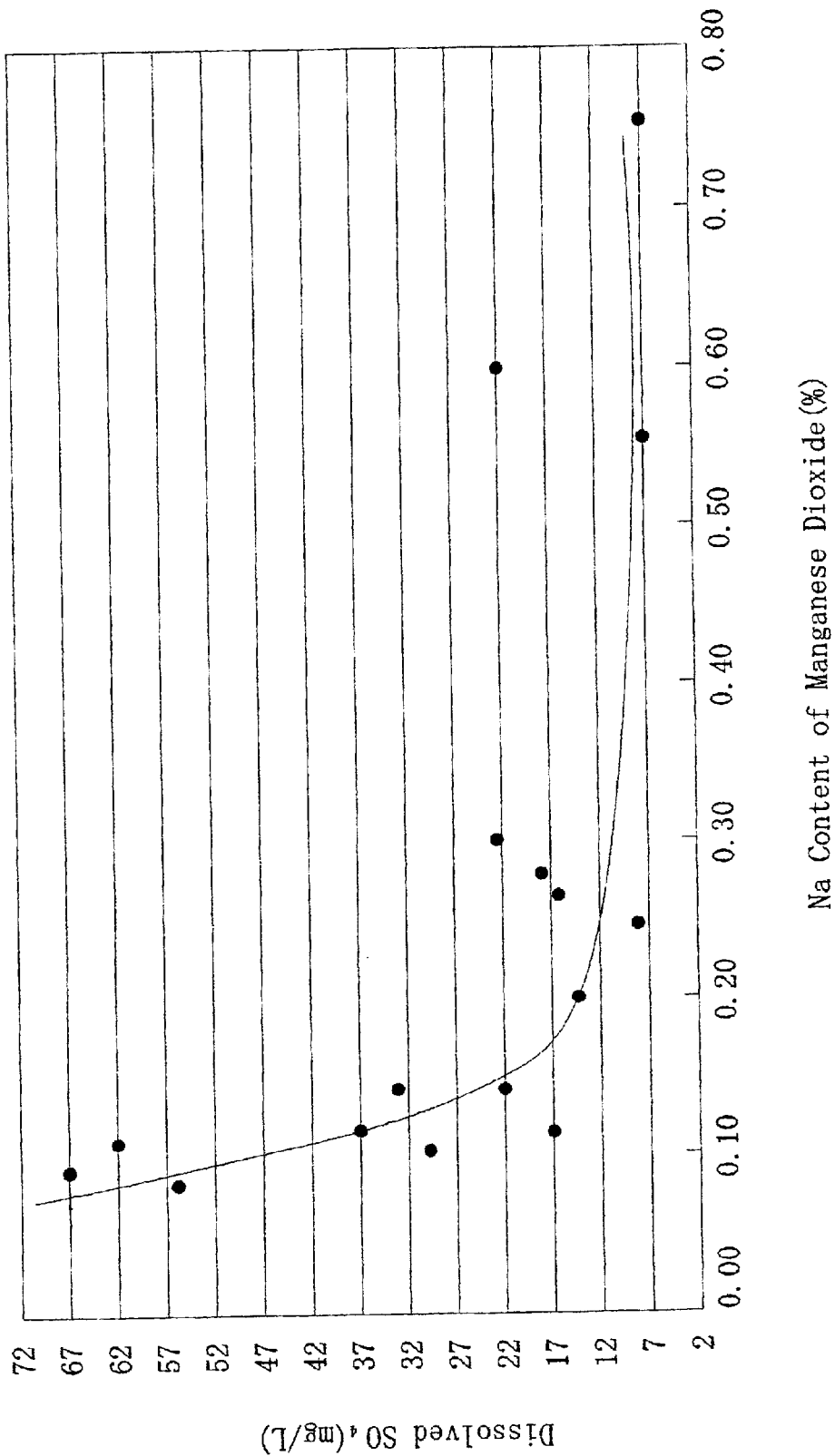
FIG. 4 is a graph of dissolved $SO_4$ vs. Na content of manganese dioxide.

Manganese dioxide species having a varied sodium content were prepared in the same manner as described above. The influence of the sodium content on JIS-pH, conductivity, Na dissolution, and $SO_4$ dissolution are shown in the plots in FIGS. 1 through 4. It is recognized from these plots that the JIS-pH and Na dissolution reduce and the $SO_4$ dissolution increases with a decrease of the Na content.

What is claimed is:

1. A process for producing manganese dioxide with a sodium content of 0.05 to 0.2% by weight for lithium primary batteries, the process consisting essentially of the steps of neutralizing electrolytic manganese dioxide with an aqueous solution containing 2.0 to 5.0g of sodium hydroxide per kg of manganese dioxide and then heating the neutralized manganese dioxide at a temperature and for a time sufficient to produce β-manganese dioxide or γ-β-manganese dioxide having a sodium content of 0.05 to 0.2% by weight.

2. The process for producing manganese dioxide for lithium primary batteries according to claim 1, wherein said electrolytic manganese dioxide has a phosphorus content of 0.05 to 2.0% by weight.

* * * * *